United States Patent [19]

Yoshida et al.

[11] Patent Number: 5,381,303
[45] Date of Patent: Jan. 10, 1995

[54] ELECTRIC DOUBLE LAYER CAPACITOR AND METHOD FOR MANUFACTURE THEREOF

[75] Inventors: Akihiko Yoshida, Hirakata; Kiyoaki Imoto, Takaishi; Seiji Nonaka, Hirakata; Ichiro Aoki, Ikoma, all of Japan

[73] Assignee: Matsushita Electric Industrial Co., Ltd., Kadoma, Japan

[21] Appl. No.: 64,933

[22] Filed: May 20, 1993

[30] Foreign Application Priority Data

| May 20, 1992 | [JP] | Japan | 4-127060 |
| May 20, 1992 | [JP] | Japan | 4-127061 |
| Sep. 7, 1992 | [JP] | Japan | 4-238045 |
| Sep. 14, 1992 | [JP] | Japan | 4-244852 |
| Sep. 14, 1992 | [JP] | Japan | 4-244853 |

[51] Int. Cl.$^6$ ............................................. H01G 9/00
[52] U.S. Cl. ........................................................ 361/502
[58] Field of Search ........................ 361/502; 29/25.03

[56] References Cited

U.S. PATENT DOCUMENTS

| 4,609,972 | 9/1986 | Edeling et al. | 361/502 |
| 4,783,723 | 11/1988 | Watanabe et al. | 361/502 |
| 5,072,335 | 12/1991 | Kurabayashi et al. | 361/502 |
| 5,172,307 | 12/1992 | Tabuchi et al. | 361/502 |

FOREIGN PATENT DOCUMENTS

| 3116708 | 5/1991 | Japan | 361/502 |
| 4199503 | 7/1992 | Japan | 361/502 |

*Primary Examiner*—Bruce A. Reynolds
*Assistant Examiner*—Gregory L. Mills
*Attorney, Agent, or Firm*—Ratner & Prestia

[57] ABSTRACT

An electric double layer capacitor of reduced internal resistance is manufactured using unit electrodes each consisting of a collector layer and a polarizable electrode layer bonded together through a diffusion layer composed of components of the two layers. To manufacture the capacitor, a pair of unit electrodes are disposed with the respective polarizable electrode layers facing each other and, after impregnation with an electrolyte, the peripheral surfaces of the unit electrodes are sealed with a sealant resin.

11 Claims, 5 Drawing Sheets

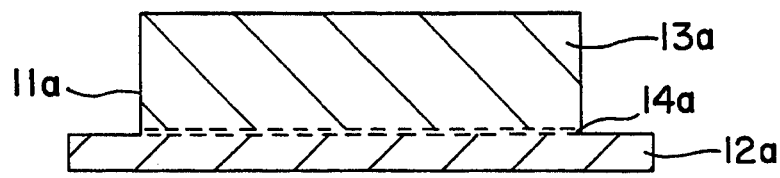
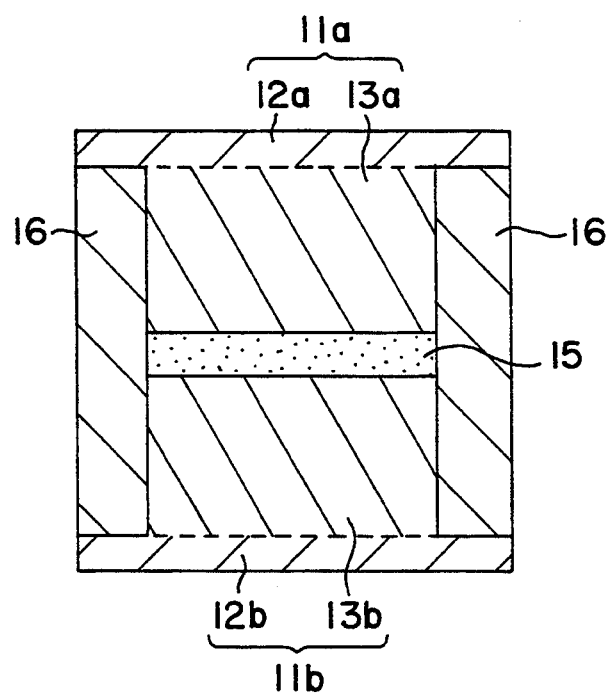
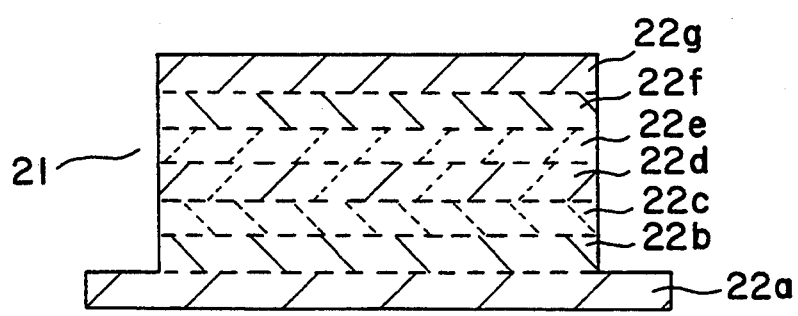

ELECTRIC DOUBLE LAYER CAPACITOR AND METHOD FOR MANUFACTURE THEREOF

BACKGROUND OF THE INVENTION

The present invention relates to an electric double layer capacitor and a method for manufacturing the same.

The electric double layer capacitor is a capacitor of large capacity which utilizes the electric energy collected in an electric double layer at the phase boundary between activated charcoal and a liquid electrolyte. Furthermore, this capacitor is capable of instantaneous charge and discharge of electrostatic capacity of the farad order. The activated charcoal heretofore used in the polarizable electrode of a capacitor of this sort is either powdery or fibrous.

The electric double layer capacitor is available in a variety of forms such as plate type, coin type, stack-up type and so on. FIG. 1 is a schematic cross-section view showing an exemplary plate type capacitor. This capacitor comprises rectangular or disk-shaped pellets (polarizable electrodes) 1a,1b each obtainable by compression-molding an activated charcoal powder in the presence of aqueous sulfuric acid, a separator 2 interposed between pellets 1a,1b, collector layers 3a,3b each made of an electrically conductive resin and disposed in contiguity with the outer surfaces of pellets 1a,1b, and an insulating rubber gasket 4 which seals off the interior of the assembly in a gas-tight manner.

FIG. 2 is a schematic cross-section view showing an exemplary coin-type capacitor which comprises disk-shaped polarizable electrodes 5a,5b each made of an electrolyte-saturated web of fibrous activated charcoal, a separator 6, metal-spray layers 7a,7b and metal cases 8a,8b which are sealed together with an insulating rubber composition 9.

FIG. 3 is a schematic cross-section view showing an exemplary stack-up type capacitor comprising a plurality of unit cells stacked up in series. The stack-up capacitor is fabricated by stacking up a number of unit cells 10, each similar to the plate type capacitor, which is necessary to obtain the required voltage rating. The assembly of unit cells is covered with a metal housing (not shown).

All of these conventional electric double layer capacitors are low in the density of electrostatic capacity per unit volume (capacitance/volume). Thus, since the capacitor utilizing an activated charcoal powder molded in the presence of aqueous sulfuric acid is fabricated by mere physical compression of the powder, the packing density of charcoal is 0.5 g/cc at most. The capacitor utilizing fibrous activated carbon is based on a woven fabric and as such has a high dimensional stability which facilitates handling during the manufacturing process and ensures high reliability. However, the voids in the woven texture are a direct cause for a decreased capacity/volume ratio. In the case of the stack-up capacitor, the parts which do not contribute to capacitance, such as the metal housing, account for a large proportion of the total volume so that the capacity/volume ratio of this type of capacitor is low.

Furthermore, the conventional electric double layer capacitor has the disadvantage of large contact resistance, between the polarizable electrode layer and the collector layer and between the collector layer and the metal casing. Thus, since the contact is established by the bonding force of a conductive adhesive or by a compressive pressure from the housing, it is difficult to implement an electric double layer capacitor of low internal resistance. Thus, the conventional capacitor could not be used in large current charge and discharge applications.

SUMMARY OF THE INVENTION

An electric double layer capacitor in accordance with an exemplary embodiment of the present invention comprises a plurality of plate-type electrodes each including a collector layer and one or two polarizable electrode layers, an ion-permeable, electron-insulating separator interposed between the electrodes, a liquid electrolyte impregnating the electrodes and a sealant disposed around the electrodes and separator. Each of the electrodes is a one-piece element formed by integration of the collector layer made of a collector material and the polarizable electrode layer made of a polarizable electrode material through a diffusion layer which is formed by interdiffusion of said collector material and polarizable electrode material.

This electric double layer capacitor electrode is a high-density device which can be obtained, for example, by high-temperature carbonization of a one-piece molding of the collector material and polarizable electrode material. Thus, an electric double layer capacitor having a high capacity/volume ratio can be manufactured. Furthermore, since the collector layer and the polarizable electrode layer are joined together by a diffusion layer composed of the corresponding materials, the contact resistance between the layers is minimized so that a capacitor of low internal resistance can be realized.

An electric double layer capacitor in accordance with another exemplary embodiment of the present invention employs unit electrodes each of which is obtained by integration of a collector layer made of a collector material and a polarizable electrode layer made of a polarizable electrode material through a mixed layer composed of the collector material and polarizable electrode material. The mixed layer has a gradient functional structure such that the ratio of the collector material to the polarizable electrode material in the mixed layer varies stepwise or continuously from the collector layer to the polarizable electrode layer.

This gradient functional structure of the electrode reduces the contact resistance between the collector layer and the polarizable electrode layer so that an electric double layer capacitor of low internal resistance is obtained. Furthermore, as the mechanical strength of the electrode is increased, a practically sufficient mechanical strength can be realized even when the proportion of activated charcoal in the polarizable electrode material is increased. In other words, a capacitor having an increased capacity/volume ratio due to an increased activated charcoal content can be implemented.

BRIEF DESCRIPTION OF THE DRAWINGS

FIG. 4 (a) and FIGS. 4 (b) are diagrammatic representations of the construction of a plate type electric double layer capacitor according to Example 1 of the present invention. FIG. 4 (a) is a schematic cross-section view of a unit electrode. FIG. 4 (b) is a schematic cross-section view of a electric double layer capacitor utilizing the unit electrode shown in FIG. 4 (a);

FIG. 5 is a schematic cross-section view showing an electrode which is used in a plate type electric double layer capacitor according to Example 2 of the present invention;

FIG. 8 (a) is a schematic perspective view showing a first unit electrode. FIG. 8 (b) is a schematic perspective view showing a second unit electrode. FIG. 8 (c) is a schematic perspective view showing the stacking of the first and second unit electrodes;

DETAILED DESCRIPTION OF THE PREFERRED EMBODIMENTS

Figure 1:
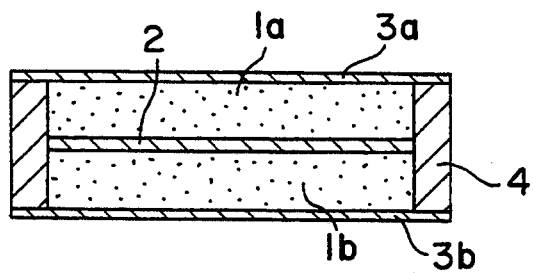
FIG. 1 is a schematic cross-section view showing a conventional plate type electric double layer capacitor.
Figure 2:
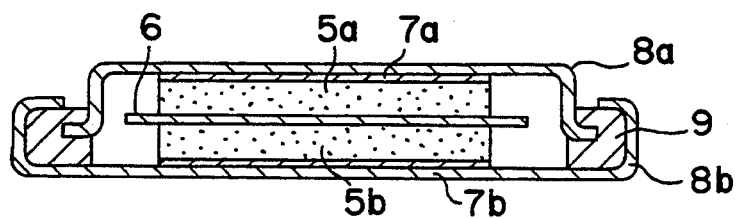
FIG. 2 is a schematic cross-section view showing a conventional coin-type electric double layer capacitor.
Figure 3:
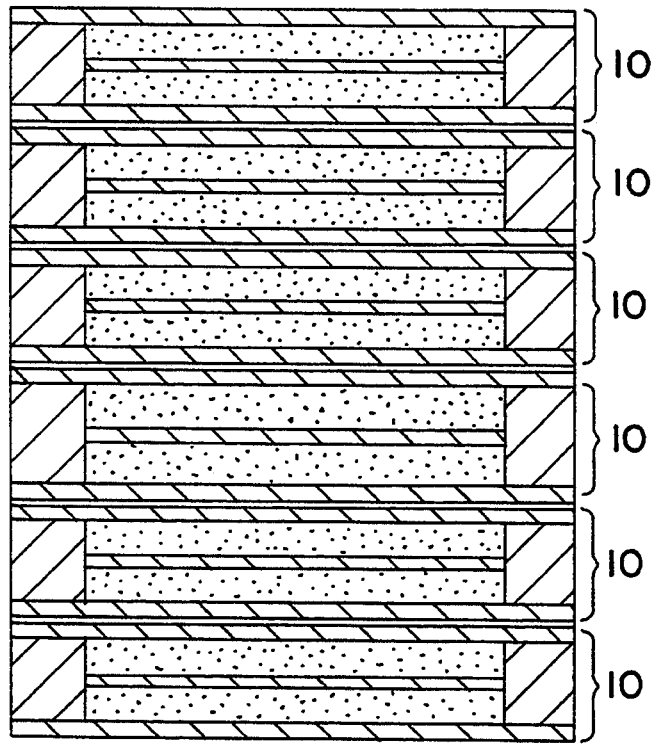
FIG. 3 is a schematic cross-section view showing a conventional stack-up type electric double layer capacitor.

The present invention is now described with reference to specific examples.

EXAMPLE 1

A polarizable electrode material prepared by blending an activated charcoal powder with a powdery phenolic resin binder in a weight ratio of 9:1 is initially compression-molded at low temperature, On one side of this initial molding is laid a collector material comprising a phenolic resin powder similar to the binder in a predetermined thickness, The electrode material and the collector material are compression-molded under heating at 200° C. The resulting molding is carbonized in an $N_2$ atmosphere at 600° C. for 1 hour to provide a unit electrode 11a of the configuration illustrated in FIG. 4 (a). The collector layer formed by carbonization of the phenolic resin powder is indicated at 12a and the polarizable electrode layer containing the activated charcoal powder is indicated at 13a.

The collector layer 12a measures 60 mm by 60 mm and 0.5 mm in thickness (for example), and the polarizable electrode layer 13a measures 50 mm by 50 mm and 0.5 mm in thickness (for example). Located across the boundary of the collector layer 12a and polarizable electrode layer 13a is a diffusion layer 14a which has been formed by inter-diffusion of the materials constituting the layers 12a, 13a, respectively, in such a manner that the layers 12a, 13a are intimately joined together.

Then, an electrode 11b consisting of a collector layer 12b and a polarizable electrode layer 13b, which is similar to electrode 11a, is fabricated. Then, as shown in FIG. 4 (b), a pair of electrodes 11a,11b are disposed with a porous polypropylene film separator 15 interposed between them and bonded together by sealing with a molten ethylene-vinyl acetate copolymer 16. Either before or after formation of sealing layers 16, the electrodes 11a,11b and separator 15 are impregnated with 30% aqueous sulfuric acid.

The thus-obtained plate type electric double layer capacitor measuring about 60 mm by 60 mm (for example) and about 2.3 mm in thickness (for example) was evaluated for capacitance/volume; internal resistance and the volume fraction of the casing (sealing layers 16). The results, as well as the corresponding data on the capacitors of Example 2 and prior Art Example 1 which are described hereinafter, are shown in Table 1. It should be understood that Prior Art Example 1 is identical in construction to the conventional plate type electric double layer capacitor described and illustrated in FIG. 1 and has approximately the same exterior size as the capacitor of Example 1.

TABLE 1

|  | Capitance/ volume F/cc | Internal resistance mΩ | Volume fraction of housing % |
|---|---|---|---|
| Example 1 | 100 | 0.5 | 5 |
| Example 2 | 120 | 0.5 | 5 |
| Prior Art Example 1 | 5 | 5.0 | 40 |

It is apparent from Table 1 that the electric double layer capacitor according to Example 1 which utilizes an electrode comprising a carbonized one-piece formation of a collector layer and polarizable electrode layer features a high charcoal packing density and a remarkably high capacity/volume ratio. Moreover, since the collector layer and the polarizable electrode layer are held in contact with each other through the diffusion layer, the contact resistance is low and the internal resistance of the capacitor is also minimized.

Furthermore, the collector layer formed by carbonization of phenolic resin is a dense vitreous carbon layer which is so impervious to gases that it can double as a housing. The ethylene-vinyl acetate copolymer used for the sealing layer is also very satisfactory in gas tightness and adhesion. Therefore, the volume fraction of the housing can be reduced sufficiently so that an electric double layer capacitor having high capacitance/volume and reliability can be implemented.

EXAMPLE 2

Polarizable electrode materials are prepared by blending a phenolic resin powder with an activated charcoal powder in varying weight ratios of (a) 10:0, (b) 8:2, (c) 6:4, (d) 5:5, (e) 4:6, (f) 2:8 and (g) 0:10 and these materials are laid up in that order and compression-molded and the resulting preliminary molding is carbonized as in Example 1. The molding is then processed to the same configuration as the electrodes 11a,11b of Example 1 to provide a couple of unit electrodes 21 (FIG. 5). The layers 22a–22g shown in FIG. 5 are carbonized layers corresponding to the above-mentioned materials of blending ratios (a) through (g), with the layer 22a being composed exclusively of the collector material and the layer 22g exclusively of the polarizable electrode material.

Using these two electrodes 21 in lieu of the electrodes 11a,11b of Example 1, a plate type electric double layer capacitor of the same exterior size as that of Example 1 is fabricated. This capacitor is then evaluated for various parameters. The results are shown in Table 1.

The electrode 21 is a gradient functional material which varies in composition serially from (a) to (g). Since the composition is thus varying serially, the strength of the entire electrode 21 is necessarily high. Of course, the layer 22a comprising a carbonized vitreous carbon is extremely low in electric resistance and the proportion of activated charcoal is on a steady increase toward the layer 22g to provide a progressively larger specific surface area. Moreover, in the interfacial regions between the layers of 22a, 22b, 22c, 22d, 22e, 22f and 22g, there exists diffusion layers (not shown) so that the contact resistance between the adjacent layers is low.

Therefore, as apparent from Table 1, the internal resistance of the capacitor according to Example 2 is by far lower than that of Prior Art Example 1. Since this means that the amount of activated charcoal per unit volume can be increased, the capacitance/volume can also be increased.

As mentioned above, the electrode 21 of the capacitor according to Example 2 has a gradient functional structure in which the ratio of collector material to polarizable electrode material varies stepwise in the thickness direction of the plate. By providing a larger number of materials varying in the ratio of collector material to polarizable electrode material and increasing the number of layers of reduced thickness, an electrode can be fabricated having a gradient functional structure in which the ratio is varying continuously. In this case, too, as in Example 2, an electric double layer capacitor with high capacitance/volume and low internal resistance characteristics can be provided.

EXAMPLE 3

Figure 6:
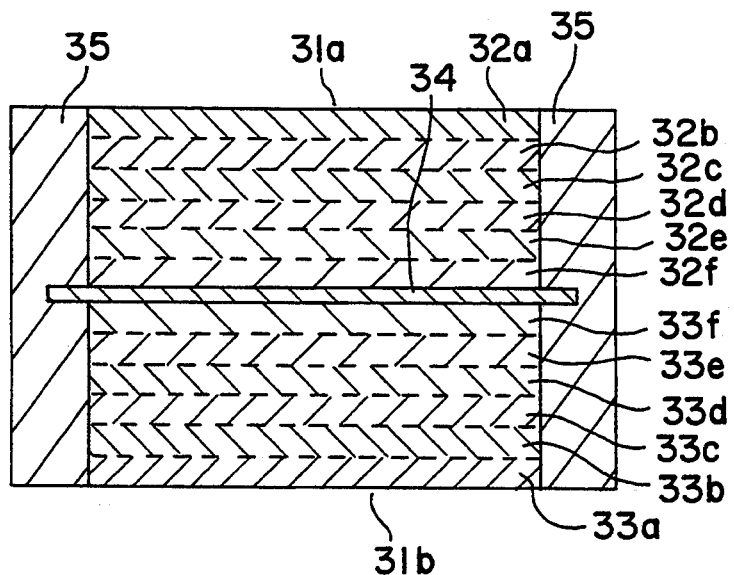
FIG. 6 is a schematic cross-section view showing a plate type electric double layer capacitor according to Example 3 of the present invention.

For use as a collector material, a powdery composition is prepared by blending a graphite powder with a non-novolak, non-resol type phenolic resin in a weight ratio of 7:3. For use as polarizable electrode material, a powdery composition is prepared by blending a phenolic resin-based activated charcoal with a non-novolak, non-resol type phenolic resin in a weight ratio of 7:3. Then, the above collector material and polarizable electrode material are blended in the weight ratios of (a) 10:0, (b) 8:2, (c) 6:4, (d) 4:6, (e) 2:8 and (f) 0:10 and the resulting compositions are arranged in the order of (a) through (f), each in a predetermined thicknesses, in a metal die. The collector material and polarizable material so arranged are compression-molded at 120°-200° C. and 100-400 kg/cm² and the resultant molding is sintered in an inert gas atmosphere at 600°-1000° C. In this manner, a pair of electrodes 31a,31b, shown in FIG. 6, are fabricated. Referring to FIG. 6, sintered layers 32a-32f and 33a-33f correspond to layers of the above materials of varying blending ratios (a)-(f), respectively. Each of layers 32a,33a is exclusively composed of collector material and each of layers 32f, 33f is exclusively composed of polarizable electrode material.

The electrodes 31a,31b are then saturated with a liquid electrolyte, viz. 30% (by weight) aqueous sulfuric acid, and using a porous polypropylene film separator 34 and a gasket 35, an electric double layer capacitor of the configuration illustrated in FIG. 6 is manufactured. The exterior size of the capacitor is 60 mm by 60 mm and 5 mm in thickness (for example). Each of these electrodes 31a,31b has a remarkably increased specific surface area toward the separator 34 because of the local abundance of activated charcoal, while it is extremely low in electric resistance toward the other side which is rich in graphite.

The internal resistance of the plate type electric double layer capacitor thus fabricated is shown in Table 2, together with the corresponding data on the capacitors of Example 4 and Prior Art Example 2 which are described hereinafter. It should be understood that the capacitor of Prior Art Example 2 is identical in construction to that of Prior Art Example 1 which is described hereinbefore, although they are different in exterior size. The exterior size of the capacitor of Prior Art Example 2 is approximately equal to that of the capacitor according to Example 3.

TABLE 2

|  | Internal resistance |
|---|---|
| Example 3 | 0.70 |
| Example 4 | 0.50 |
| Example 2 Prior Art | 2.00 |

Because each of the electrodes 31a, 31b of Example 3 has the gradient functional structure described above, the interlayer contact resistance is low as explained in Example 2 and, hence, the internal resistance of the capacitor of Example 3 is remarkably low.

EXAMPLE 4

Figure 7:
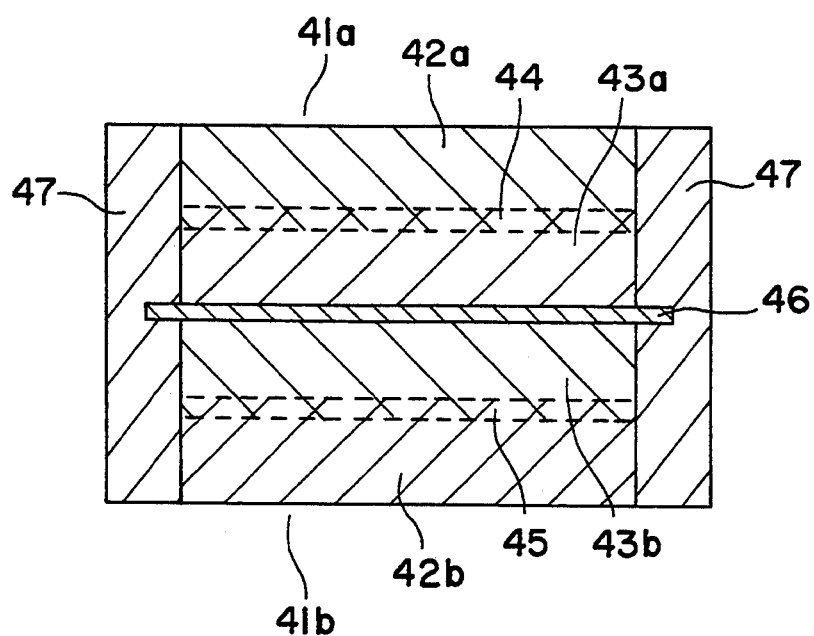
FIG. 7 is a schematic cross-section view showing a plate type electric double layer capacitor according to Example 4 of the present invention.

For use as collector material, a powdery composition is prepared by blending a graphite powder with a non-novolak, non-resol type phenolic resin in a weight ratio of 7;3. On the other hand, for use as polarizable electrode material, a powdery composition is prepared by blending a phenolic resin-based activated carbon with a non-novolak, non-resol type phenolic resin in a weight ratio of 7:3. These materials are laid in superimposition in a die and compression-molded at 120°-200° C. and 100-400 kg/cm². The molding obtained is then sintered in an inert gas atmosphere at 600°-1000° C. In this manner, electrodes 41a,41b shown in FIG. 7 are fabricated. Referring to FIG. 7, the reference symbols 42a,42b stand for collector layers, 43a,43b for polarizable electrode layers, and 44,45 for diffusion layers each formed by interdiffusion of the collector material and polarizable electrode material.

Using the above two electrodes 41a,41b in lieu of the electrodes 31a,31b described in Example 3, an electric double layer capacitor of the same configuration as the capacitor of Example 3 is fabricated. The separator 46 and gasket 47 are of the same type as the corresponding members used in Example 3. The internal resistance of this capacitor is shown in Table 2. It is apparent from Table 2 that the internal resistance of the capacitor of example 4 is also considerably lower than that of the capacitor of Prior Art Example 2.

EXAMPLE 5

For use as collector material, a graphite powder with a particle diameter of 10 μm is blended with 30% by weight of a phenolic resin powder with a particle diameter of 20 μm. As polarizable electrode material, a powdery composition is prepared by blending a phenolic resin-based activated carbon powder with a particle diameter of 5 μm with 30% by weight of a phenolic resin as a binder.

The collector material is first placed in a die and the polarizable electrode material is then placed over the collector materials each in a predetermined thickness.

The charge is then compression-molded at 180° C. and 120 kg/cm². The resulting molding is then sintered in an inert gas atmosphere at 800° C. to carbonize the phenolic resin. This carbonized resin molding is processed to the configuration illustrated in FIG. 8 (a) to provide a double-layer first electrode 51 consisting of a collector layer 52 and a polarizable electrode layer 53.

On the other hand, a die is charged with the polarizable electrode material, collector material and polarizable electrode material in the order mentioned in three discrete layers, each in a predetermined thickness, and the charge is compression-molded at 180° C. and 120 kg/cm². The resulting molding is heated in an inert gas atmosphere at 800° C. to carbonize the phenolic resin. The carbonized resin molding is processed to the configuration illustrated in FIG. 8 (b) to provide a plurality of three-layer second electrodes 54 each consisting of a collector layer 55 and a couple of polarizable electrode layers 56a,56b disposed on both sides of the collector layer 55.

Figure 8A:
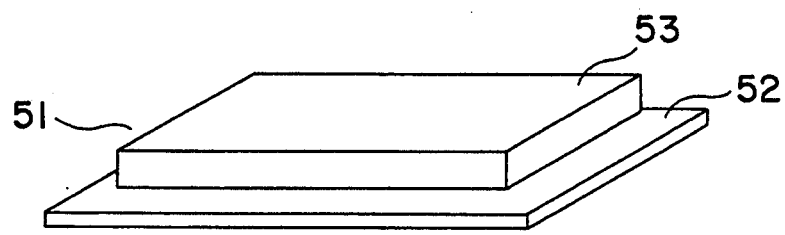
FIG. 8 (a), FIG. 8 (b) and FIG. 8 (c) are diagrammatic representations of the construction of a stack-up type electric double layer capacitor according to Example 5 of the present invention.
Figure 8B:
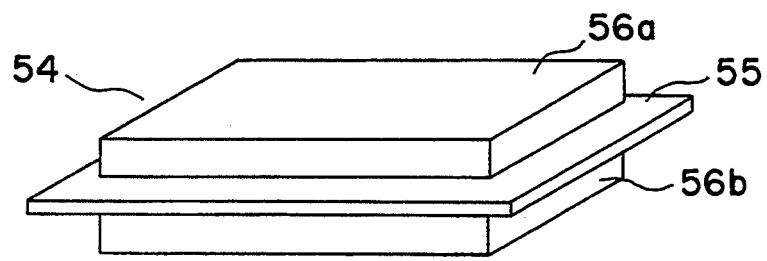
Figure 8C:
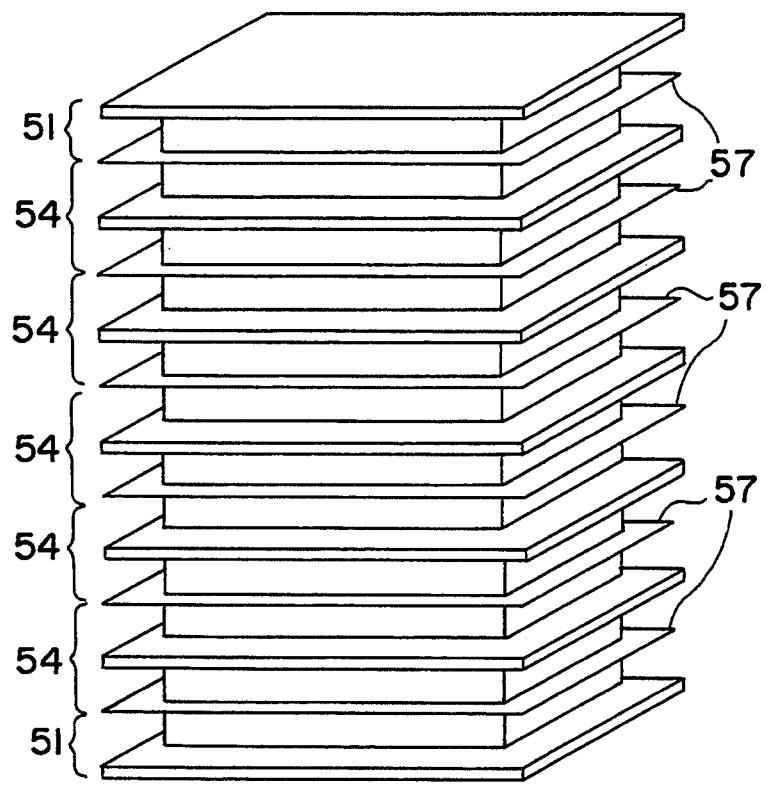

Then, as shown in FIG. 8 (c), these electrodes are stacked with two first electrodes 51 at the top and the bottoms respectively, and five second electrodes 54 between the first electrodes, with a porous polypropylene film separator 57 interposed between layers, and this stack is impregnated with 30% aqueous sulfuric acid.

The assembly is then sealed around using an ethylene-vinyl acetate copolymer sealant to provide a stack-up type electric double layer capacitor with a voltage rating of 5.5 V.

The measured internal resistance of this capacitor is shown in Table 3, together with the data on the capacitors according to Examples 6–8 and Comparative Example 1 which are described hereinafter, It should be understood that the capacitor of Comparative Example 1 is a stack-up type electric double layer capacitor with a rating of 5.5 V as fabricated by stacking 6 unit cells each consisting of a couple of said first unit electrodes 51 laid one on top of the other with a separator interposed.

TABLE 3

| | Internal resistance (Ω) |
|---|---|
| Example 5 | 0.25 |
| Example 6 | 0.38 |
| Example 7 | 0.32 |
| Example 8 | 0.19 |
| Comparative Example 1 | 1.03 |

It will be apparent from Table 3 that the electric double layer capacitor of Example 5 has a considerably lower internal resistance than that of the capacitor according to Comparative Example 1.

The electric double layer capacitor fabricated by stacking first electrodes 51 and second electrodes 54 in combination has low contact resistance because, unlike the capacitor of Comparative Example 1, there is no interfacial boundary between collector layers. Moreover, the formation of a diffusion layer between the collector layer and polarizable electrode layer of the electrode results in a reduced internal resistance of the capacitor.

EXAMPLE 6

The same collector material and polarizable electrode material as described in Example 5 are provided.

Then, a metal die is charged with the collector material in a predetermined thickness and the charge is compression-molded at 120 kg/cm² and 180° C.

On the other hand, a die is charged with the polarizable electrode material in a predetermined thickness and the charge is compression-molded at 120 kg/cm² and 180° C.

The collector plate and polarizable electrode plate thus provided are bonded with a phenolic resin-based carbon adhesive and heated in an inert gas atmosphere at 800° C. to carbonize the phenolic resin and thereby provide a double layer first electrode. On the other hand, the polarizable electrode plate is bonded to either side of the collector plate with a phenolic resin-based carbon adhesive and the phenolic resin is carbonized by heating at 800° C. in an inert gas atmosphere to provide a three-layer second electrode.

Then, as in Example 5, two units of the first electrode and five units of the second electrode are stacked to fabricate a stack-up electric double layer capacitor. The internal resistance value of this capacitor is given in Table 3.

Thus, even if an electric double layer capacitor is manufactured using electrodes fabricated with an adhesive based on the same material as contained in the collector and polarizable electrode materials, carbonization produces a diffusion layer between the collector layer and adhesive layer and between the adhesive layer and polarized electrode layer, with the result that the contact resistance between the collector layer and polarizable electrode layer is reduced and accordingly the internal resistance of the capacitor is decreased.

While a phenolic resin-based carbon adhesive is used as the adhesive in the above examples, any other adhesive can be employed only if it provides for electric conductivity on bonding of the collector layer to the polarizable electrode layer.

EXAMPLE 7

Except that, in lieu of the adhesive used in Example 6, a mixture of the collector material and polarizable electrode material mentioned in Example 5 is used as the adhesive, the procedure of Example 6 is otherwise repeated to manufacture a stack-up type electric double layer capacitor. The measured internal resistance of this capacitor is given in Table 3.

Thus, a capacitor of low internal resistance can also be manufactured by using a mixture of collector material and polarizable electrode material as the adhesive.

EXAMPLE 8

The same collector material and polarizable electrode material as used in Example 5 are provided.

The above collector material and polarizable electrode material are blended in the weight ratios of (a) 10:0, (b) 8:2, (c) 6:4, (d) 4:6, (e) 2:8 and (f) 010. These blends are arranged in the order of (a) through (f), each in a predetermined thickness, in a metal die and compression-molded at 120 kg/cm² and 180° C. The resulting molding is heated in an inert gas atmosphere at 800° C. to carbonize the phenolic resin and thereby provide a first electrode.

Then, the above collector material and polarizable electrode material are blended in the weight ratios of (g) 0:10, (h) 2:8, (i) 4:6, (j) 6:4, (k) 8:2, (l) 10:0, (m) 8:2, (n) 6:4, (o) 4:6, (p) 2:8, and (q) 0:10. These blends are arranged in the order of (g) through (q), each in a predetermined thickness, in a die and compression-molded at 120 kg/cm² and 180° C. The molding thus obtained is heated in an inert gas atmosphere at 800° C. to carbonize the phenolic resin and thereby provide a second electrode.

Using the above first and second electrodes each having a gradient functional structure in lieu of the first electrode 51 and second electrode 54 described in Example 5, and electric double layer capacitor with a voltage rating of 5.5 V is manufactured in otherwise the same manner as Example 5. The measured internal resistance of this capacitor is given in Table 3. It is apparent from Table 3 that the capacitor of Example 8 in which the first and second electrodes each having a gradient functional structure are used has a considerably lower internal resistance than that of the capacitor of Comparative Example 1.

EXAMPLE 9

In a solution of a binder phenolic resin in ethanol is dispersed 4 parts by weight of a phenolic resin-based activated charcoal powder per part by weight of the phenolic resin and the solvent ethanol is then removed from the dispersion to provide an activated charcoal-binder dispersion of high concentration. This wet composition is compression-molded into a plate at 120 kg/cm² and 180° C. and the plate is heated in an inert gas atmosphere at 800° C. to carbonize the phenolic resin and thereby provide a polarizable electrode plate for the capacitor of Example 9.

As a control, a polarizable electrode plate for Comparative Example 2 is fabricated in the following manner. First, a dry activated charcoal-binder composition is prepared by dry-blending a phenolic resin-based activated charcoal powder with a phenolic resin and 4 parts by weight of a phenolic resin-based activated carbon powder per part by weight of the phenolic resin as the binder. This dry composition is compression-molded and carbonized under the same conditions as described above for the wet composition.

The flexural strength and specific resistance values of these polarizable electrode plates are shown in Table 4, along with the corresponding data on Example 10 which is described hereinafter.

TABLE 4

| Polarized electrode plate for | Flexural strength (kg/cm²) | Specific resistance (Ω · cm) |
| --- | --- | --- |
| Example 9 | 110 | 0.07 |
| Example 10 | 110 | 0.05 |
| Comparative Example 2 | 95 | 0.10 |

Figure 9:
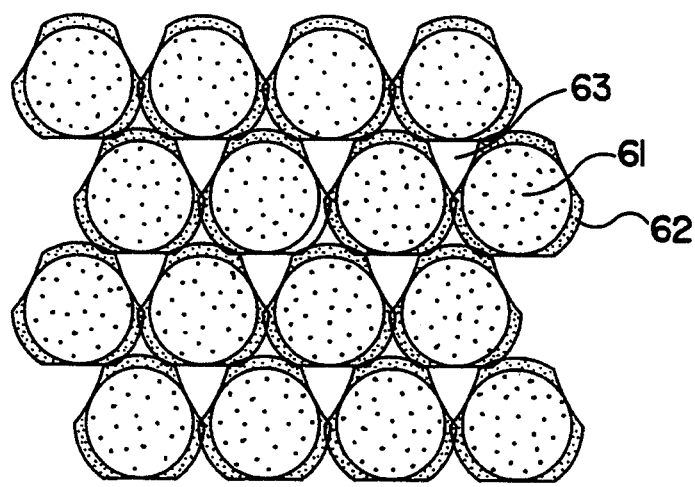
FIG. 9 is a schematic view showing an exemplary construction of a polarizable electrode layer in an electric double layer capacitor in accordance with the present invention.
Figure 10:
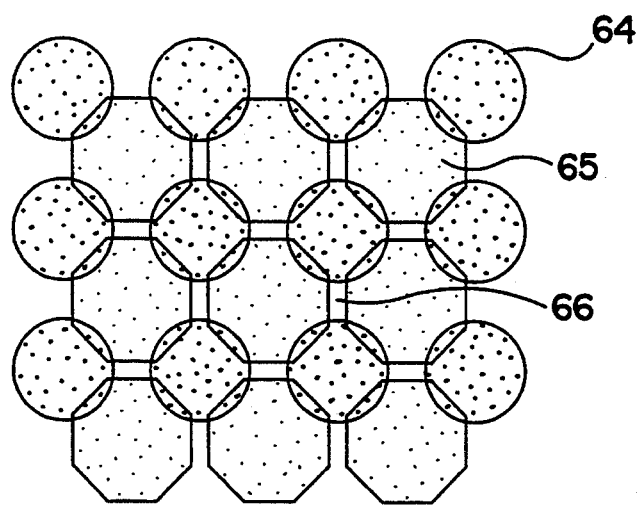
FIG. 10 is a schematic view showing an exemplary construction of a polarizable electrode layer in an electric double layer capacitor of a reference example.

Schematic views showing the microscopic structures of the polarizable electrode plates used in Example 9 and Comparative Example 2 are presented in FIGS. 9 and 10.

It is apparent from FIG. 9 that, in the polarizable electrode plate fabricated from the wet composition, the surface of each activated carbon particle 61 is thinly covered with the carbonized binder 62 and, as particles of carbonized binder 62 are bonded together, the activated charcoal particles 61 are also intimately bound together. By carbonizing the binder, particles of activated charcoal 61 and binder 62 are intimately bound together to ensure a high degree of electrical conductivity. Voids or air spaces 63 are observed between the particles. On the other hand, it is seen from FIG. 10 that in the polarizable electrode plate fabricated from the dry composition, the density of activated charcoal particles 64 bound to carbonized binder 65 is low, with large air spaces 66.

Therefore, compared with the polarized electrode plate fabricated from the dry composition, the polarized electrode plate made from the wet composition has a higher flexural strength and a lower specific resistance as can be seen from Table 4.

Then, plate type electric double layer capacitors are manufactured using the dry composition and wet composition respectively. First, polarizable electrode plates are prepared by compression-molding under the same conditions as mentioned hereinbefore. Then, a collector material comprising a mixture of graphite powder and 30 weight % of phenolic resin powder is laid on top of the above plate and compression-molded under the same conditions. The resulting molding is carbonized under the same conditions as previously mentioned to fabricate an electrode, 20 mm in diameter and 2 mm thick (for example), which consists of a polarizable electrode layer (1.5 mm thick) and a collector layer (0.5 mm thick). A couple of electrodes fabricated from each material are juxtaposed with the respective polarizable electrode layers facing each other through a polyethylene separator and the assembly is impregnated with 30% (by weight) aqueous sulfuric acid. Then, the assembly is sealed around with an ethylene-vinyl acetate copolymer to provide an electric double layer capacitor. These capacitors are designated as Example 9 and Comparative Example 2. The measured electrostatic capacity and internal resistance values of these capacitors are shown in Table 5, together with the corresponding data on the capacitor of Example 10 which is described hereinafter.

It is apparent from Table 5 that the capacitor of Example 9 is greater in electrostatic capacity and lower in internal resistance that the capacitor of Comparative Example 2.

TABLE 5

| | Electrostatic capacity (F) | Internal resistance (Ω) |
| --- | --- | --- |
| Example 9 | 72 | 0.9 |
| Example 10 | 72 | 0.5 |
| Comparative Example 2 | 66 | 1.2 |

A liquid petroleum pitch is mixed with 4 parts by weight of a phenolic resin-based activated charcoal powder and the composition is dried to provide a polarizable electrode material. Using this polarizable electrode material in lieu of the wet composition of Example 9, the procedure of Example 9 is otherwise repeated to fabricate a polarizable electrode plate for Example 10 and manufacture a plate type electric double layer capacitor of Example 10. The characteristic values of the electrode and capacitor are shown in Tables 4 and 5.

It is apparent from Tables 4 and 5 that a capacitor having excellent characteristics can be obtained by using petroleum pitch as the binder.

Similar results are obtained when coal or wood pitch is used in lieu of petroleum pitch.

While the present invention has so far been described by way of Examples 1 through 10, the invention is by no means limited to these specific examples and many modifications can be made by those skilled in the art without departing from the spirit and scope of the invention.

By way of illustration, whereas vitreous carbon and graphite were mentioned as preferred examples of collector material, other electrically conductive materials can be likewise employed. As a preferred example of polarizable electrode material, an activated charcoal prepared by using a phenolic resin as the precursor was mentioned. However, other types of activated charcoal can also be employed. The collector material and polarizable electrode material need not be powdery but may be fibrous or granular.

The separator is not limited to a polypropylene or polyethylene separator. Thus, any ion-permeable and electronically insulating porous film or membrane can be employed. As the electrolyte, not only sulfuric acid but also an organic electrolyte solution can be employed.

The sealant is preferably an olefin resin and particularly an ethylene-vinyl acetate copolymer or a derivative thereof.

In the examples given hereinabove, plate type or stack-up electric double layer capacitors having electrodes sealed with a resin sealant were described. However, the present invention can be applied to coin type capacitors and to capacitors in which the whole electrode is encased in a housing. Particularly in a capacitor having such a housing, the housing must be tough enough to withstand the compressive force applied to the collector layer and polarizable electrode layer for an improved contact. In the present invention, however, because the collector layer and polarizable electrode layer are provided as a one-piece artifact, the housing need not be so robust and sturdy.

In the above description of the method for manufacturing an electric double layer capacitor according to the present invention, phenolic resin was used as a preferred binder for the collector and polarizable electrode materials in the Examples but other thermosetting binders which melt at temperatures below the curing temperature may also be employed.

What is claimed:

1. An electric double layer capacitor comprising:
    a plurality of unit electrodes, each one of said plurality of unit electrodes including a collector layer made of a collector material, a diffusion layer made of a collector material and a polarizable electrode material and at least one polarizable electrode layer made of a polarizable electrode material, wherein said diffusion layer exists between said collector layer and said polarizable electrode layer,
    an ion permeable, electron-insulating separator interposed between two of said plurality of unit electrodes,
    a liquid electrolyte saturating at least one of said plurality of unit electrodes, and
    a sealing member disposed around said two of said plurality of unit electrodes and said separator.

2. An electric double layer capacitor according to claim 1 wherein at least one of said plurality of unit electrodes is a first unit electrode in which said collector layer is made of a gas-tight electrically conductive material, said polarizable electrode layer is disposed on one side of said collector layer, and two of said first unit electrodes are disposed in juxtaposition with their respective polarizable electrode layers facing each other.

3. An electric double layer capacitor according to claim 2 wherein at least one of said plurality of unit electrodes is a second unit electrode in which said collector layer is made of a gas-tight electrically conductive material, and said polarizable electrode layer is disposed on either side of said collector layer between two of said first unit electrodes.

4. An electric double layer capacitor according to claim 2 wherein said gas-tight electrically conductive material is selected from the group consisting of vitreous carbon and graphite.

5. An electric double layer capacitor according to claim 1 wherein at least one of said collector material and polarizable electrode material has a texture selected from the group consisting of a powdery texture, a fibrous texture and a granular texture.

6. An electric double layer capacitor according to claim 1 wherein said polarizable electrode material comprises an activated charcoal and a binder.

7. An electric double layer capacitor according to claim 6 wherein said activated charcoal has a surface which is at least partially covered with said binder.

8. An electric double layer capacitor according to claim 6 wherein said binder is one of a sintered polymer and a sintered pitch.

9. An electric double layer capacitor according to claim 1 wherein said collector material includes an electrically conductive carbonaceous material and said polarizable electrode material includes an activated charcoal and a carbonized thermosetting resin.

10. An electric double layer capacitor according to claim 1 wherein said sealing member comprises a polyolefin resin.

11. An electric double layer capacitor according to claim 10 wherein said polyolefin resin is one of an ethylene-vinyl acetate copolymer and a derivative of an ethylene vinyl acetate copolymer.

* * * * *